March 21, 1950     R. M. McHAN     2,501,230
MECHANICAL FISHING FLOAT OR BOB
Filed Nov. 12, 1948
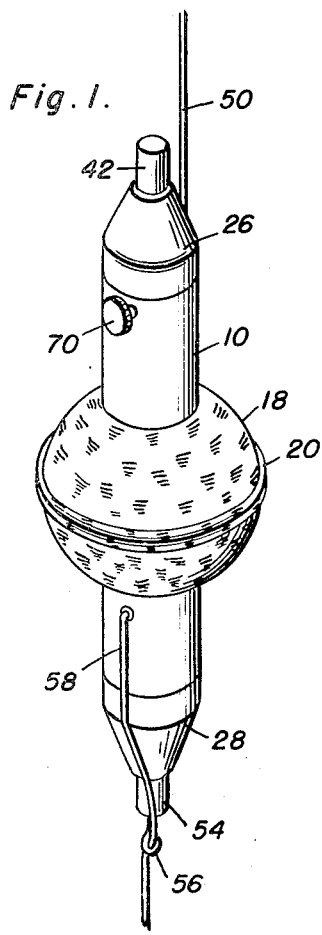
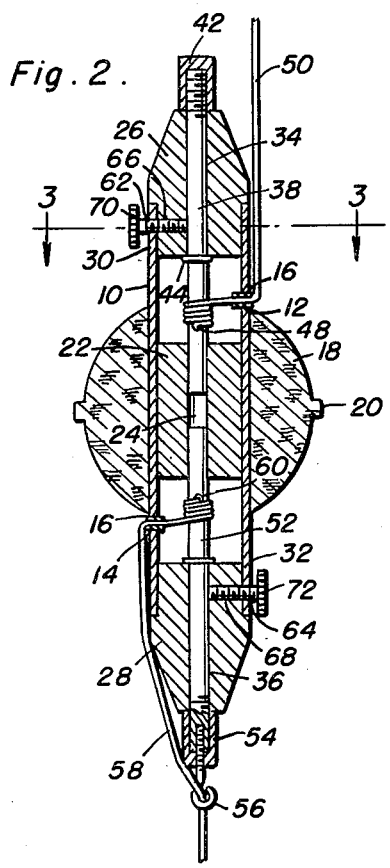
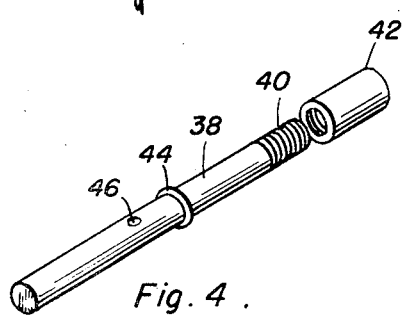
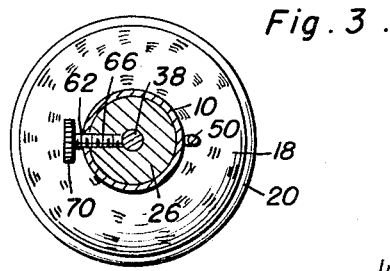
Inventor
Roy M. McHan
By Clarence A. O'Brien
and Harvey B. Jacobson
Attorneys

UNITED STATES PATENT OFFICE 2,501,230

MECHANICAL FISHING FLOAT OR BOB

Roy M. McHan, Vinemont, Ala.

Application November 12, 1948, Serial No. 59,572

7 Claims. (Cl. 43—43.11)

This invention relates to a mechanical fishing float or bob and has for its primary object to provide a float or bob whereby either or both of the lines from the fishing pole to the bob or the hook to the bob may be adjustably wound inside the bob.

Another object of the invention is to provide a float or bob which prevents tangling of the fishing lines thus rendering the use of the bob easy and efficient.

Yet another object of the invention is to provide a bob or float, the distance of which from the pole and/or hook may be readily and easily adjusted as desired.

And yet another object of the invention is to provide a bob or float which obviates the necessity of winding the fishing line on the pole.

These, together with various ancillary objects and features of the invention which will later become apparent as the following description proceeds, are attained by the device, a preferred embodiment of which has been illustrated by way of example only in the accompanying drawings, wherein:

Figure 1 is a perspective view of the device;

Figure 2 is a longitudinal sectional view of the device;

Figure 3 is a sectional view taken substantially on the plane of section line 3—3 of Figure 2; and Figure 4 is an assembly view in perspective of a spindle or pin and a handle portion.

Specific reference is now made to the drawings. In the several views in the accompanying drawings and in the following specification similar reference characters indicate corresponding elements throughout.

Indicated generally at 10 is an elongated hollow body, preferably cylindrical, constructed of wood, light-weight metal, plastic, or the like. At opposite sides of the body and adjacent the top and bottom edges thereof, a pair of radially extending apertures 12 and 14 are provided in which are positioned rubber grommets 16, the functions of which apertures will be described hereinafter.

Removably positioned about the central portion of the elongated body 10 is a cork body 18 which is preferably spherical in shape, having an annular enlargement or ring 20 about the center thereof. As will be readily understood, the cork 20 is employed to lend floatability to the bob and to maintain the bob in its proper upright position when placed in the water.

Positioned centrally in the body 10 is a block or bearing 22 having a longitudinally extending bore 24 therethrough. Retained frictionally on each of the open ends of the elongated body 10 are bearing blocks 26 and 28, which as shown in the drawings are preferably tapered, being retained on the hollow elongated body 10 by means of recesses 30 and 32. Extending through each of the bearing blocks 26 and 28 are longitudinally extending bores 34 and 36, respectively.

Extending through the bore 34 and the upper portion of the longitudinal bore 24 is a substantially cylindrical spindle or pin 38 which is screw-threaded, as at 40, to engageably receive the internal threads of a cap or handle portion 42, the lower edge of which cap or spindle portion abuts the bearing block 26. It will be understood that the spindle 38 is rotatable in both the bores 34 and 24. To prevent the spindle 38 from slipping through the body, a shoulder 44 is provided on the spindle adjacent the outer face of the block 26. The spindle 38 is further provided with a radial aperture 46 in which is positioned a rubber grommet 48; and a line 50 from the fishing pole (not shown) extends through the aperture 12 in the hollow body 10 and thence through the aperture 46 in the spindle and is knotted to be retained on the spindle. Thus, it will be seen that the rotation of the spindle 38 will wind the line 50 internally of the hollow body 10.

Extending through the bore 36 and the lower portion of the bore 24 is a second spindle 52 which is similar in construction to the spindle 38 described hereinabove and which is screw-threaded at its lower end to engage a cap or handle portion 54 thereon. In addition, the lowermost end of the spindle 52 is internally threaded to engage the externally threaded portion of a hook 56 which, as seen clearly in Figure 2, extends through the cap 54. The hook 56 serves as a guide for the line 58 which is attached to a fishing hook (not shown) and extends through the aperture 14 and an aperture 60, adjacent the upper end of the spindle 52, where the line 58 is mounted and retained on the spindle. Thus, it will be seen that a rotation of the spindle 52 will wind the hook line 58 internally of the hollow body on the spindle 52.

To retain each of the spindles 38 and 52 in an adjusted position against rotation and simultaneously to retain each of the bearing blocks 26 and 28 on the hollow body 10, the following means is provided. Apertures 62 and 64 are provided adjacent the upper and lower edges of the hollow body 10 which are in alignment with laterally extending bores 66 and 68 in the blocks 26 and 28, respectively, through which apertures and bores extend set screws 70 and 72. Thus, tightening the screws 70 and 72 against the spindles 38 and 52 retains the spindles in fixed adjusted position in the body 10 against rotation.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a fishing device having a pole and a hook, a fishing float or bob comprising an elongated hollow body having spaced apertures, a first and second spindle rotatably journaled in said body and having apertures therethrough, a line from the pole extending through one of said body apertures and said aperture in said first spindle, means for adjustably retaining said line on said first spindle, a second line from the hook extending through the other of said body apertures and said aperture in said second spindle, and means for adjustably retaining said second line on said second spindle.

2. The combination of claim 1, wherein both of said means include set screws extending through said body and engageable with said spindles.

3. The combination of claim 2, wherein said spindles include external extensions and handle portions on said extensions for manually rotating said spindles.

4. The combination of claim 1, wherein both of said means include bearing blocks removably retained on the ends of said hollow body and set screws extending through said body and blocks adapted to abut said spindles.

5. The combination of claim 4, wherein said bearing blocks are tapered to reduce the resistance to movement of the float in the water.

6. The combination of claim 5, wherein said spindles include external extensions and handle portions on said extensions for manually rotating said spindles.

7. The combination of claim 6, wherein one of said handle portions carries a hook engaging one of said lines for guiding the same.

ROY M. McHAN.

REFERENCES CITED

The following references are of record in the file of this patent:

UNITED STATES PATENTS

| Number | Name | Date |
|---|---|---|
| 541,789 | Kunzelman | June 25, 1895 |
| 755,683 | Miller | Mar. 29, 1904 |
| 926,576 | Kneisley | June 29, 1909 |
| 2,214,961 | Hawley | Sept. 17, 1940 |
| 2,223,823 | Hampton | Dec. 3, 1940 |
| 2,316,074 | Kimbrough | Apr. 6, 1943 |